United States Patent
Zukas et al.

(10) Patent No.: US 9,351,129 B2
(45) Date of Patent: May 24, 2016

(54) WIFI HAZARDOUS AREA VOIP PAGING TELEPHONE AND SYSTEM

(71) Applicant: Hubbell Incorporated, Shelton, CT (US)

(72) Inventors: John V. Zukas, Zionsville, PA (US); Jeff T. Reid, Sinking Spring, PA (US); Jeffrey M. Weist, Reading, PA (US); Roger W. Deihm, Mohnton, PA (US); Ross H. Moughan, Wyomissing, PA (US)

(73) Assignee: Hubbell Incorporated, Shelton, CT (US)

( * ) Notice: Subject to any disclaimer, the term of this patent is extended or adjusted under 35 U.S.C. 154(b) by 93 days.

(21) Appl. No.: 14/471,642

(22) Filed: Aug. 28, 2014

(65) Prior Publication Data

US 2015/0063192 A1 Mar. 5, 2015

Related U.S. Application Data

(60) Provisional application No. 61/872,460, filed on Aug. 30, 2013.

(51) Int. Cl.
| | |
|---|---|
| *H04L 12/66* | (2006.01) |
| *H04W 4/06* | (2009.01) |
| *H04B 1/3827* | (2015.01) |
| *H04W 84/12* | (2009.01) |
| *H04W 68/10* | (2009.01) |
| *H04W 76/00* | (2009.01) |

(52) U.S. Cl.
CPC .............. *H04W 4/06* (2013.01); *H04B 1/3827* (2013.01); *H04W 68/10* (2013.01); *H04W 76/007* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,876,213 B2 | 1/2011 | Angelo et al. | |
| 2003/0053434 A1 | 3/2003 | Chow et al. | |
| 2006/0187900 A1 | 8/2006 | Akbar et al. | |
| 2008/0233990 A1 | 9/2008 | Jen | |
| 2010/0159898 A1* | 6/2010 | Krzyzanowski | G06F 9/4445 455/414.1 |
| 2012/0190325 A1 | 7/2012 | Abu-Hakima et al. | |

OTHER PUBLICATIONS

Model 352-701 and 352-703, Division 1 VoIP Telephones, GAI-TRONICS® Corporation, a Hubbell Company, Pub. 42004-456A, www.gai-tronics.com, Jan. 2012, 20 pages.
Model 352-001, 352-002, 352-003, and 352-004, Division 1 Telephones, GAI-TRONICS Corporation, a Hubbell Company, Pub. 42004-454A, www.gai-tronics.com, Dec. 2011, 13 pages.

(Continued)

*Primary Examiner* — Duc C Ho
(74) *Attorney, Agent, or Firm* — Dickinson Wright PLLC

(57) ABSTRACT

VoIP-based telephone is provided with integral paging amplifier and a WiFi antenna, and is designed for hazardous areas such as UL Class I, Division 1, Division 2 and IEC Ex including the WiFi antenna. A system of VoIP-based telephone units supports multicast to provide prioritized and loudspeaker-zoned paging. The integral 30-watt class D amplifier in the telephone units provides sufficient volume for paging and ringing to be reliably detected by personnel in hazardous locations. Upon lifting the handset, the telephone unit can automatically revert to standard VoIP telephone operation. The telephones can be powered via DC, AC or with Power over Ethernet (POE).

13 Claims, 16 Drawing Sheets

(56) References Cited

OTHER PUBLICATIONS

Model 352-7xx and 352-8xx Division 1 VoIP Page Phones—Wired & WiFi, GAI-TRONICS® Corporation, a Hubbell Company, Pub. 42004-486A, www.gai-tronics.com, May 2014, 28 pages.

VoIP Telephones, VoIP Telephone Configuration Guide, GAI TRONICS a Division of Hubbell Litd.; Document Ref: 502-20-0119-001, Issue 3, Apr. 2013, 88 pages.

Equipment Specification, GAI-TRONICS Voice Over Internet Protocol (VOIP) and WiFi VoIP Telephone Products, GAI-TRONICS®, a Hubbell Company, May 18, 2012; 31 pages.

Page/Party® Solutions, GAI-TRONICS®, a Hubbell Company; Pub. 980500, Rev. 9/2010, 8 pages.

Introducing . . . WiFi Paging Telephone, http://www.gai-tronics.com/whatnew/wifi_paging_telephone.html, printed Aug. 27, 2013, 2 pages.

* cited by examiner

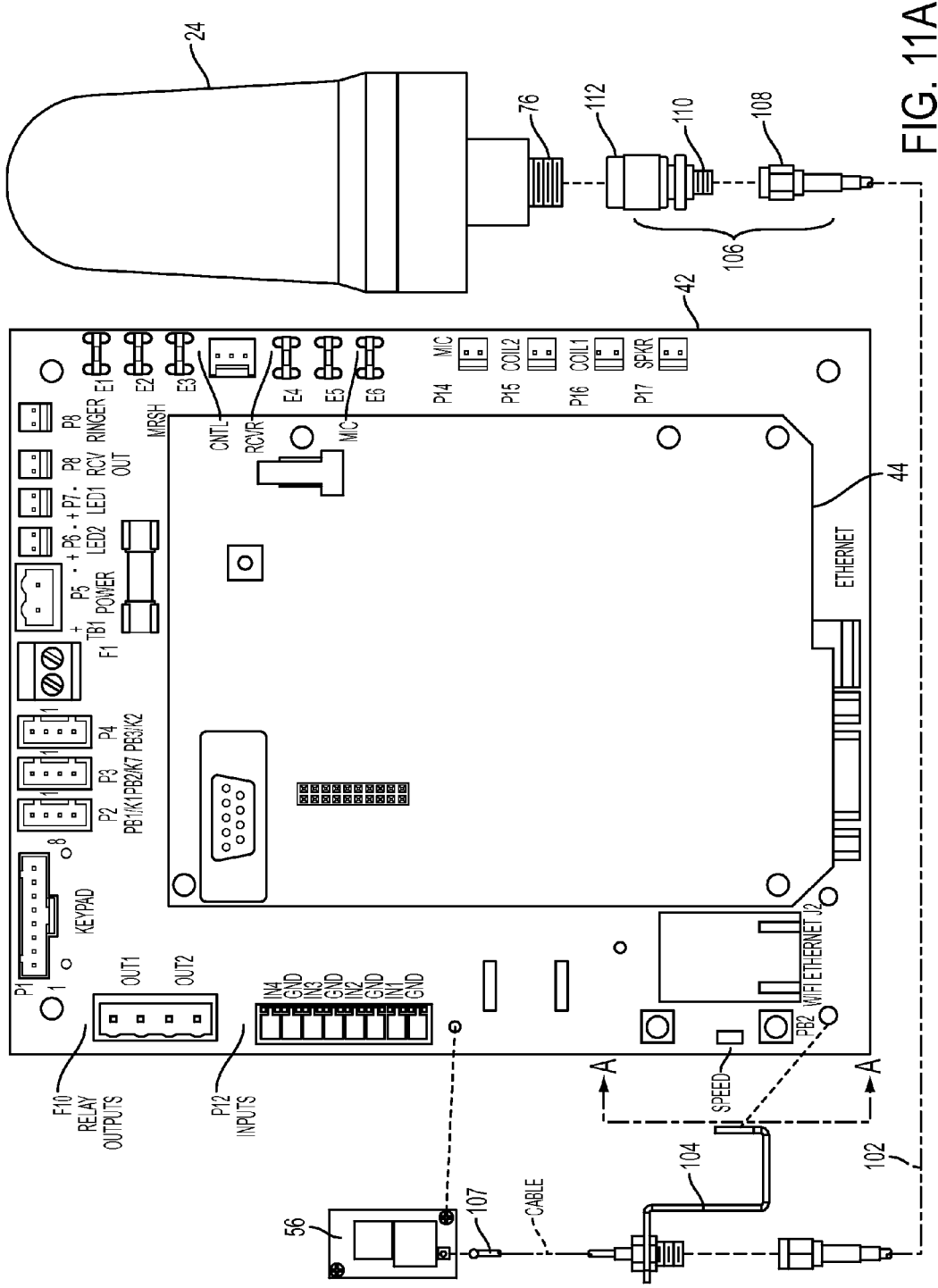

WIFI HAZARDOUS AREA VOIP PAGING TELEPHONE AND SYSTEM

This application claims the benefit of U.S. provisional application Ser. No. 61/872,460, filed Aug. 30, 2013, the entire contents of which are incorporated herein by reference.

BACKGROUND OF THE INVENTION

1. Field of the Invention

The present invention relates generally to hazardous location communications and, more specifically, to telephones in a voice over Internet Protocol (VoIP) system that are designed to incorporate, for example, UL Class I Division I protection methods, as well as provide improved multicast capabilities such as hazardous area WiFi, loudspeaker-zoned paging, and prioritized paging groups.

2. Description of Related Art

To regulate the design of equipment used in potentially explosive atmospheres, special certification schemes and governing organizations have been established in various regions globally. In other words, equipment in hazardous locations or areas can be designed to comply with safety standards and thereby gain approval from safety standards organizations such as Underwriters Laboratories (UL). Safety standards organizations can have different definitions or classifications for hazardous locations. For example, a UL Hazardous Location is an explosive atmosphere due to the presence of flammable gases, vapors, or liquids (Class I), combustible dusts (Class II) or ignitable fibers or flyings (Class III). An area may also be considered "hazardous" for other reasons, such as the use of electrical equipment in the vicinity of water, the risk of personal injury from moving or falling parts, or even the presence of biological hazards. While hazards are associated with all of these conditions, areas are only considered hazardous (classified) locations under conditions defined by the NEC, CEC, IEC 60079-10, or CENELEC EN 60079-10 or similar certification organization (s), as applicable. This approach to classifying hazardous locations is used by the United States (National Electrical Code), Canada (Canadian Electrical Code), Europe (CENELEC EN60079-10) and throughout the world (IEC 60079-10). Other certification organizations and/or schemes for equipment used in classified hazardous locations can include, but are not limited to, ATEX directives 94/9/EC and 1999/92/EC in the European Union, North America laboratories such as Intertek (ETL), Factory Mutual (FM), Canadian Standards Association (CSA) and the IECEx International Certification Scheme.

Examples of hazardous locations can be various industrial sites such as land and offshore oil rigs, chemical plants, refineries, mills, and loading facilities, which can be subjected to harsh environments, as well as create potentially unsafe environments due to the presence of gases or other combustible materials. It can therefore also be desirous to obtain ABS-type approval to assure that marine vessels and offshore structures comply with rules promulgated by the American Bureau of Shipping (ABS) for design, construction and periodic survey.

A need exists for an IP telephone that can provide loud ringing (e.g., for peer to peer communications) and loud WiFi IP-based paging (e.g., to provide alerts for emergency responses) with multicast capabilities in a hazardous location such as an industrial site that is often characterized by significant ambient noise level due from use of heavy equipment. A need also exists for such an IP telephone to carry UL certification for Class 1 Division 1, Groups, B, C and D, and Class II Division 1 Groups E, F and G and Class III, or similar safety standard approval, at a minimum, and IEC Zone 1, at a minimum.

SUMMARY OF THE INVENTION

Illustrative embodiments of the present invention address at least the above problems and/or disadvantages and provide at least the advantages described below.

Illustrative embodiments of the present invention provide a voice over internet protocol (VoIP) unit having (a) a VoIP control module for VoIP operations among VoIP units that is configured to selectively establish peer-to-peer communication between the VoIP unit and another one of the VoIP units, and multicast paging among a plurality of the units; (b) a WiFi antenna configured for operation in a hazardous area in compliance with the one or more hazardous area standards; (c) a WiFi interface module connected to the VoIP control module and the WiFi antenna and configured to exchange bi-directional Ethernet data between the antenna and the VoIP control module; and (d) an enclosure configured to comply with one or more hazardous area standards and enclose the VoIP control module and the WiFi interface module; wherein the antenna is mounted on the exterior of the enclosure through an opening therein and pressure fitted within the opening to create a flame path that retains the compliance of the enclosure with the one or more hazardous area standards when the antenna is deployed in the opening.

Illustrative embodiments of the present invention provide a VoIP unit wherein the antenna is pressure fitted within the exterior of the enclosure using threads along the inner circumference of the opening that cooperate with threads on the exterior section of the antenna installed within the opening. For example, the threads along the inner circumference of the opening and the threads on the exterior section of the antenna correspond to threads specified for the one or more hazardous area standards such as ¾" NPT (National Pipe Tapered) threads.

Illustrative embodiments of the present invention provide a VoIP unit wherein a connector is provided on the end of the antenna and extends from the opening into the interior of the enclosure for connection to the WiFi interface module and provides a flame path that retains the compliance of the enclosure with the one or more hazardous area standards when the opening and the antenna are deployed.

Illustrative embodiments of the present invention provide a VoIP unit wherein a class D amplifier and loudspeaker connected to the amplifier are provided to output a signal from the VoIP control module that can be detected by users above industrial ambient noise levels associated with the hazardous area in which the VoIP unit is deployed. For example, the amplifier can be 30 watts, and the loudspeaker can be 8 watts or 30 watts.

Illustrative embodiments of the present invention provide a VoIP unit wherein the antenna is approved for deployment in UL Class 1, Division 1 environments, or UL Class 1, Division 2 environments, or IEC Ex environments.

Illustrative embodiments of the present invention provide a VoIP unit wherein the antenna its wired to the WiFi interface module within the enclosure using a WiFi pigtail cable connected at one end thereof to a port on the WiFi interface module and connected at the other end thereof to a first end of a coaxial cable, the coaxial cable having a second end thereof connected to the antenna. For example, the second end of the coaxial cable connects to a radio frequency (RF) connector on the antenna via a coaxial cable assembly. When the second end of the coaxial cable comprises a RP-SMA plug, for example, the coaxial cable assembly can comprise an adapter comprising an RP-SMA jack to RP-TNC plug combination.

Illustrative embodiments of the present invention provide a VoIP unit wherein a faceplate of the enclosure has at least one of a speaker, a handset having earpiece and microphone, and a headset.

Illustrative embodiments of the present invention provide a VoIP unit that is SIP-compatible. For example, the VoIP unit is configured to employ SIP for messaging between the peer VoIP units to create, modify or terminate two-party and multicast sessions. Further, the VoIP unit is assigned a SIP address and a priority number within a selected range of numbers that corresponds to a respective one of a plurality of prioritized multicast addresses corresponding to respective paging groups. As such, the the VoIP unit is configurable to initiate and receive different priorities of multicast paging via the WiFi antenna.

Other aspects, advantages, and salient features of the invention will become apparent to those skilled in the art from the following detailed description, which, taken in conjunction with the annexed drawings, discloses illustrative embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIG. 11A is a diagram depicting the connection of a WiFi antenna to a VoIP/WiFi interface board in a VoIP telephone in accordance with an illustrative embodiment of the present invention.

Throughout the drawings, the same drawing reference numerals will be understood to refer to the same elements, features, and structures.

DETAILED DESCRIPTION OF ILLUSTRATIVE EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
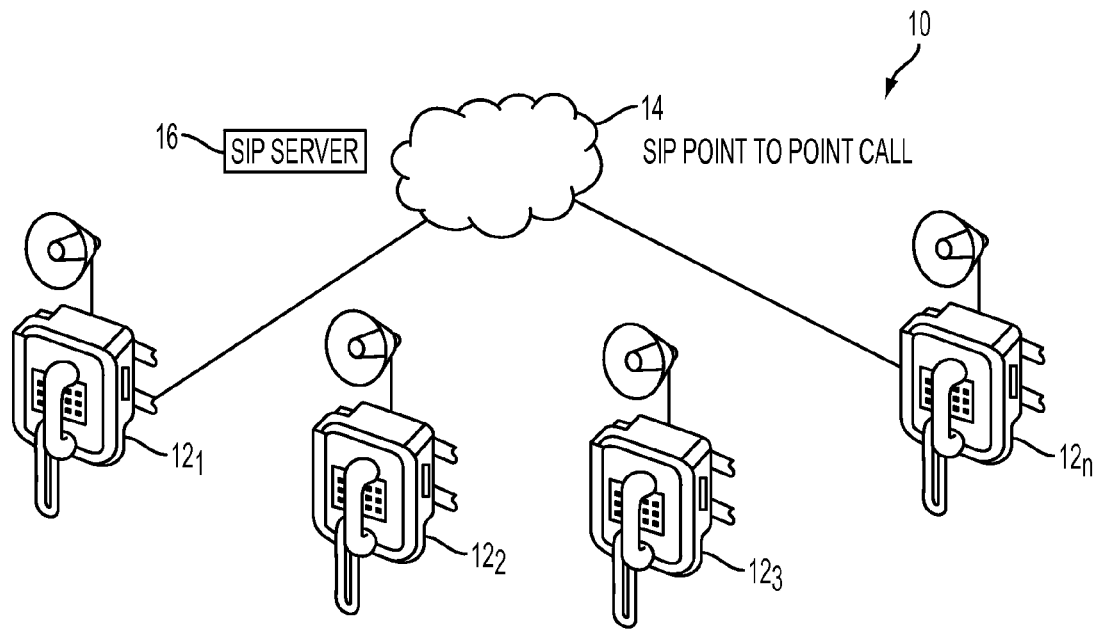
FIGS. 1A and 1B depict, respectively, a system of VoIP telephones configured according to illustrative embodiments of the present invention to provide peer-to-peer (P2P) communication and WiFi multicast paging in a classified hazardous area.
Figure 1B:
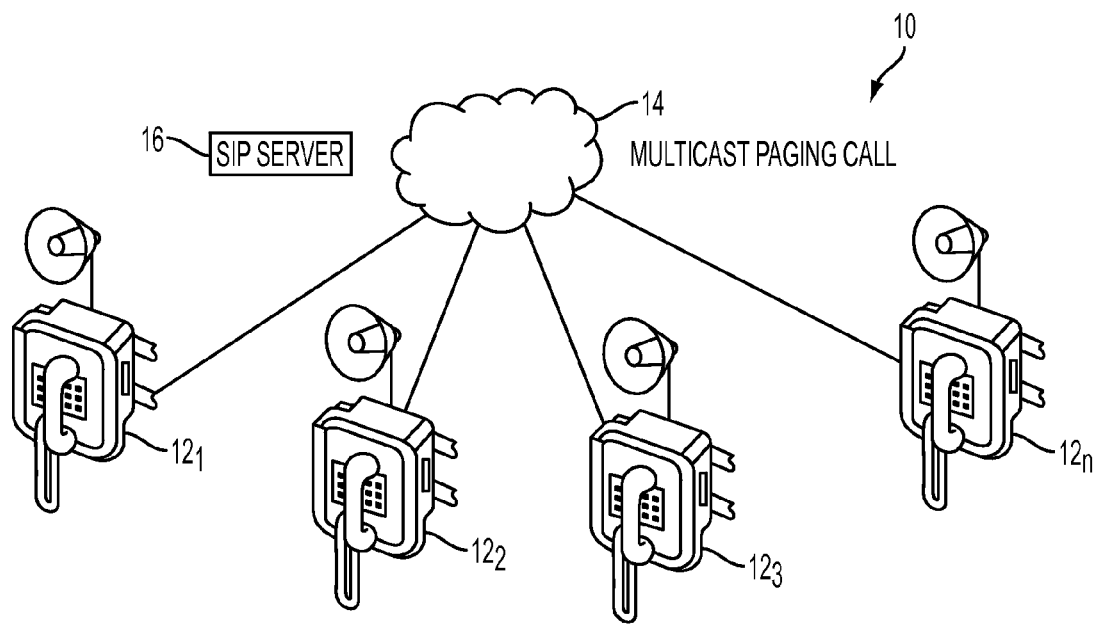

In accordance with an illustrative embodiment of the present invention, a VoIP system 10 is depicted in FIGS. 1A and 1B that is configured for providing, respectively, peer-to-peer (P2P) communication and WiFi multicast paging in a hazardous location (e.g., a classified hazardous location in accordance with standards promulgated and/or regulated by a safety standards organization such as UL, ABS, CSA, ATEX or other as explained above). The system 10 comprises a plurality of VoIP telephones $12_1, \ldots, 12_n$, and at least one server 16 connected via a network 14.

With continued reference to FIGS. 1A and 1B, the illustrative network 16 can provide wireless or wired communication links to the VoIP telephones 12 and server 16. For example, the VoIP telephones 12 can be connected via a wireless network 14 that operates according to wireless IEEE 802.11 specifications for implementing wireless local area network (WLAN) computer communications (e.g., IEEE 802.11a, 802.11b and 802.11g). IEEE 802.11b and 802.11g connectivity, for example, can ensure simple integration into existing VoIP networks.

The WiFi capability of the VoIP telephones 12 is advantageous because it enables the telephones to be free of network cabling (e.g., requiring no home runs and no star wiring). As described below, each telephone 12 is a unique native WiFi VoIP telephone that comes equipped with an on-board 30 W Class D amplifier connected to a loudspeaker to provide sufficiently loud audio output suitable for an industrial location that may have significant ambient noise levels. The telephone need only be provided with local power (e.g., AC, or DC) for a 30 W amplifier and loudspeaker provided in each telephone 12. Accordingly, the built-in high-efficiency Class D paging amplifier provides up to 30 watts of speaker output, allowing multicast broadcast page announcements over speakers.

With unrepeated line of sight operation of up to 300 ft outdoors, the telephone 12 can be located within its desired environment and connected to a network connection outside that environment. It is to be understood that other wireless communication protocols can be used and that the system 10 can employ wired connectivity (e.g., the telephones 12 can be configured for 10/100 BaseT Ethernet RJ45, Cat5 or Cat5e, and UTP). Both wired and wireless telephones 12 can employ Static IP provisioning or Dynamic Host Configuration Protocol (DHCP). For example, VoIP can be deployed via two VoIP telephones connected in a peer-to-peer configuration with the need for a LAN; however, a 10/100 BaseT Ethernet with SIP server is required for systems containing three or more VoIP telephones. Alternatively, for WiFi VoIP service, two VoIP telephones can communicate wirelessly in a peer-to-peer configuration without the need for a LAN connection. A wireless pick-up point connected to a 10/100 BaseT Ethernet with SIP server is required for systems containing three or more WiFi VoIP telephones (or combination of WiFi and hardwired-connected VoIP telephones). In addition to directed point-to-point dialing (i.e., peer-to-peer), directly or via a SIP server, each telephone can receive a multicast broadcast. Multicast allows a single audio stream to be sent to multiple end points simultaneously to achieve multi-point paging or Public Address functionality over IP. For multicast functionality, the SIP server supports multicast functionality and each telephone is configured or enabled to receive multicast packets.

The VoIP telephones 12 can be Session Initiation Protocol (SIP), RFC3261-compliant. The server 16 is illustrated as a SIP server. By way of an example, the SIP-compatible VoIP system 10 uses SIP to control multimedia communication sessions such as voice calls over Internet Protocol (IP) or VoIP networks; that is, the VoIP system 10 employs SIP for messaging between peers for creating, modifying and terminating two-party (unicast) or multiparty (multicast) sessions consisting of one or several media streams. Multicast allows a single audio stream to be received by multiple endpoints (e.g., telephones 12) simultaneously to achieve multipoint paging or Public Address functionality over IP. Accordingly, a multicast-compliant SIP server 16 can be employed. The SIP server 16 can be the main component of an IP PBX (not shown), handling the setup of all SIP calls in the network 14 and can also be referred to as a SIP Proxy or a Registrar. The server 16 can optionally include a media server in RTP, or the media server can be located elsewhere in the network 14. In other words, the SIP server 16 may only handle call setup and call tear down in the SIP-based system 10 and not actually transmit or receive any audio, which would instead be done by a separate media server (not shown) in RTP.

Each WiFi paging telephone 12 can be configured with a dedicated SIP address and can have a number (e.g., eight (8)) of prioritized multicast addresses such that each telephone 12 can be a part of up to eight (8) paging groups. As described in more detail below, each telephone 12 can be configured with 8 definable multicast address ranges for zoning (e.g., with individual priority levels defined for each multicast address), as well assignable relay outputs and splash tones. Accordingly, with its IP connectivity and loudspeaker, each telephone 12 enables point-to-point calling with a "ring" tone generated to the loudspeaker, or multicast operation whereby the telephone 12 is able to receive up to eight (8) multicast group pages. Calling one-to-many enables a user to page up to eight (8) paging groups. On lifting the receiver or handset on the telephone 12, the user reverts to the dedicated SIP address, The multicast paging capability of each of the telephones 12 therefore allows them to be advantageously operated in selected zones in a hazardous location such as an industrial site. For example, for safety (e.g., timely alerts to quickly evacuate personnel from an affected area within an industrial facility), separate multicast addresses can be assigned to respective zones including different local areas on the same floor of a building, to different floors of the building, to the entire building, and to the entire plant or industrial site. The telephones 12 can then be configured to accept pages from one or more of these multicast addresses depending on where the telephone is deployed, in addition to peer to peer calls to its dedicated SIP address.

Figure 2:
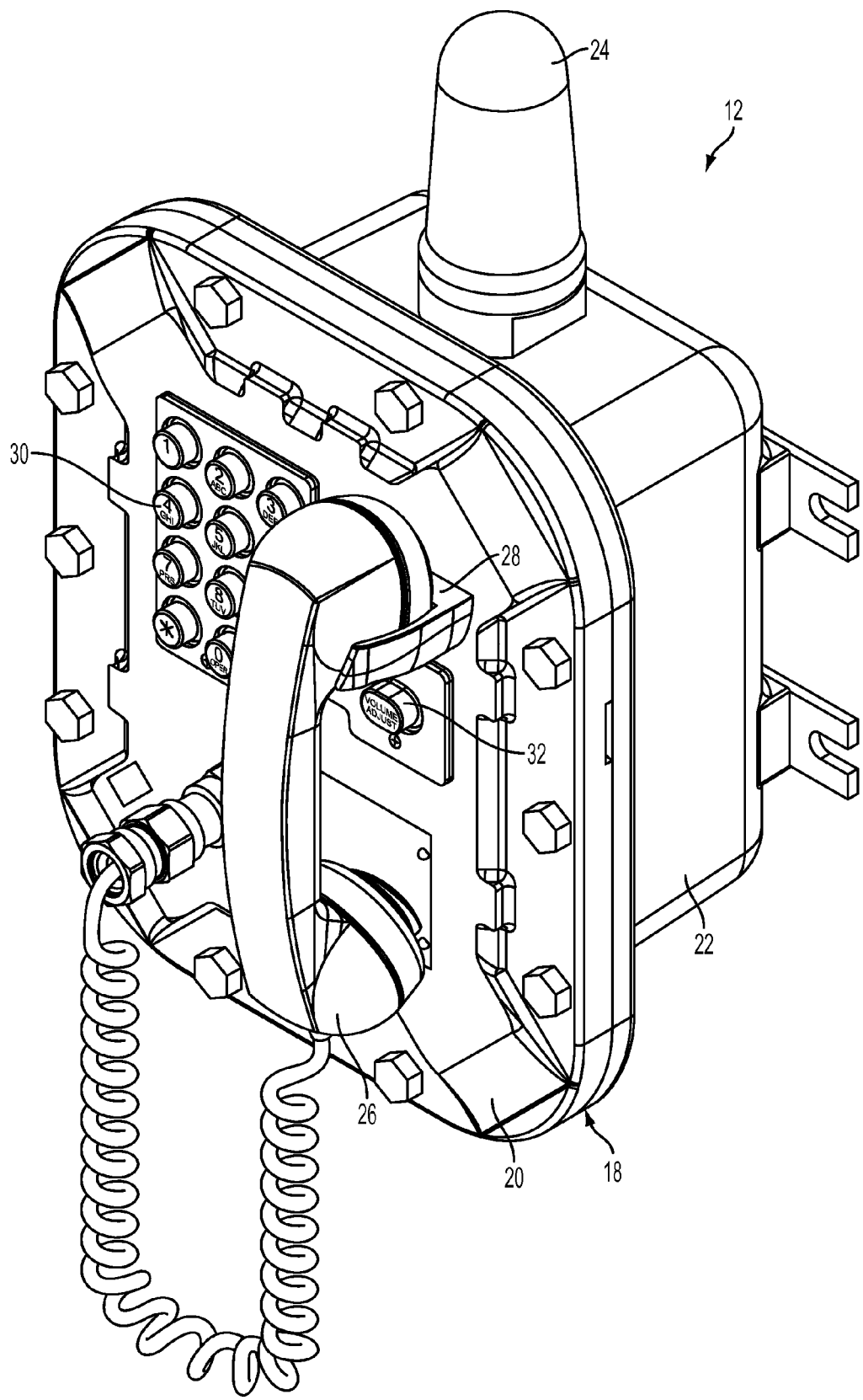
FIG. 2 is a perspective view of a VoIP telephone configured according to an illustrative embodiment of the present invention.
Figure 3:
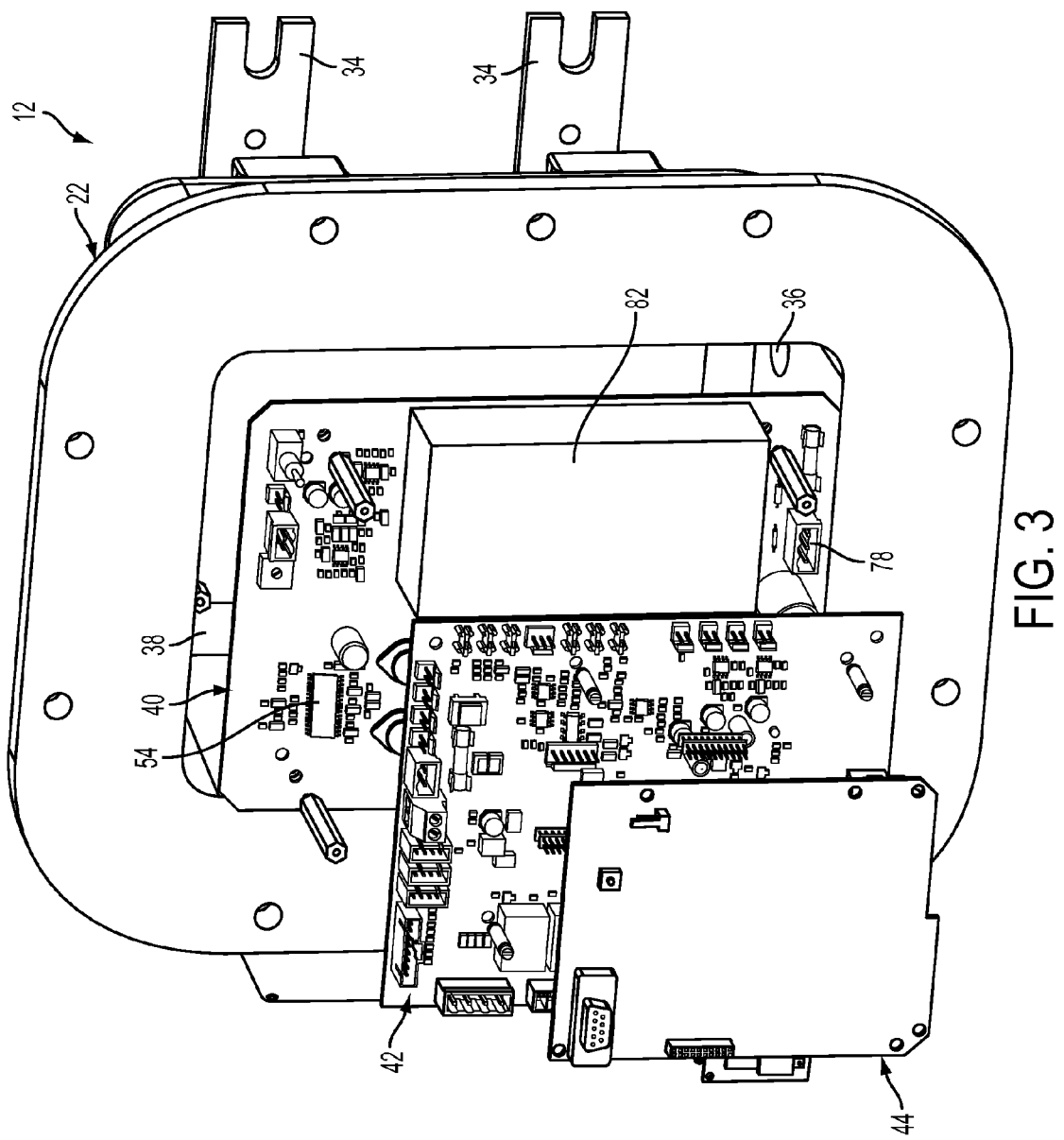
FIG. 3 is an exploded view of the circuit enclosure of the VoIP telephone in FIG. 2.
Figure 4:
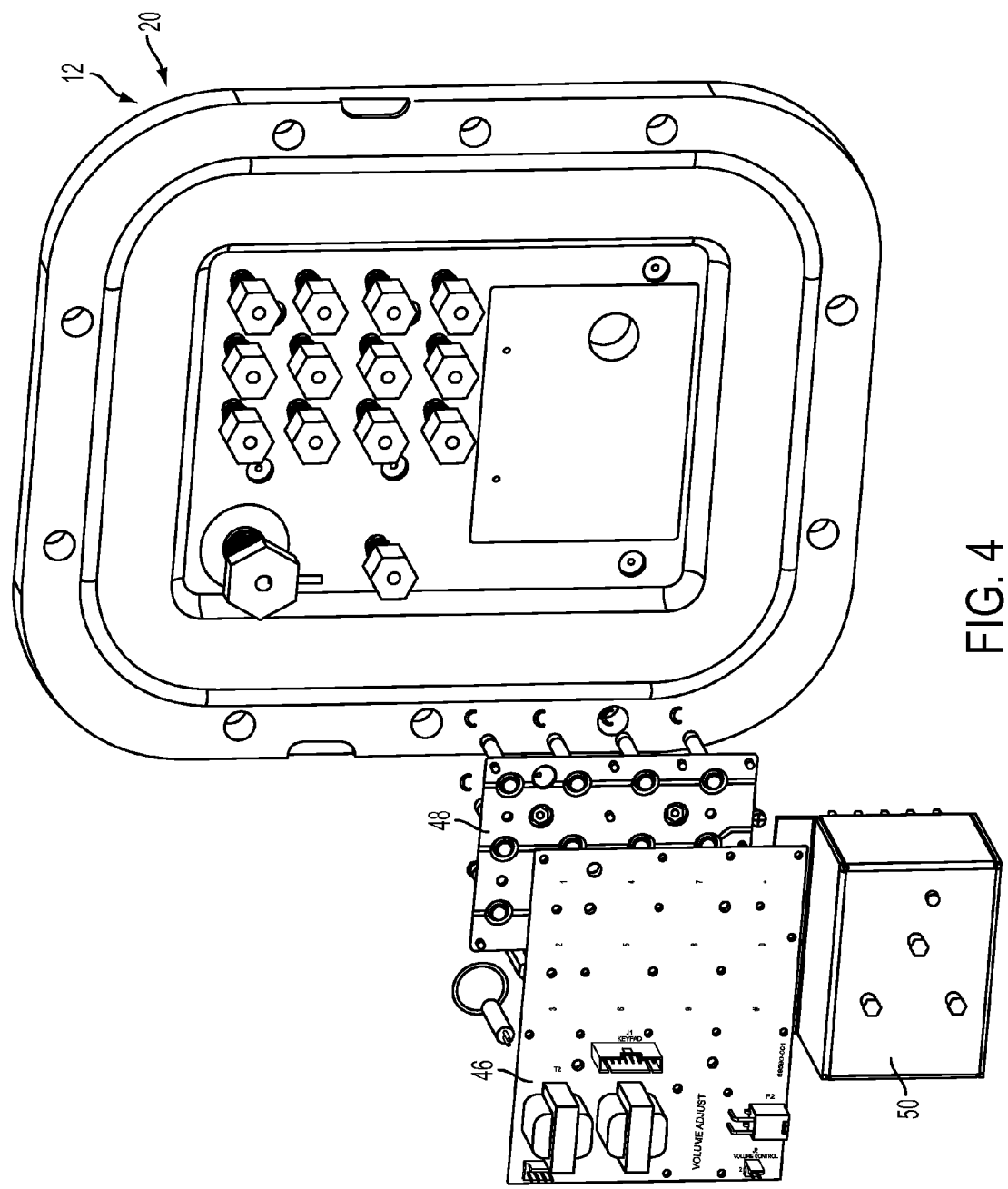
FIG. 4 is an internal view of a faceplate of the VoIP telephone of FIG. 2 and an exploded view of components that are mounted to the faceplate.
Figure 5:
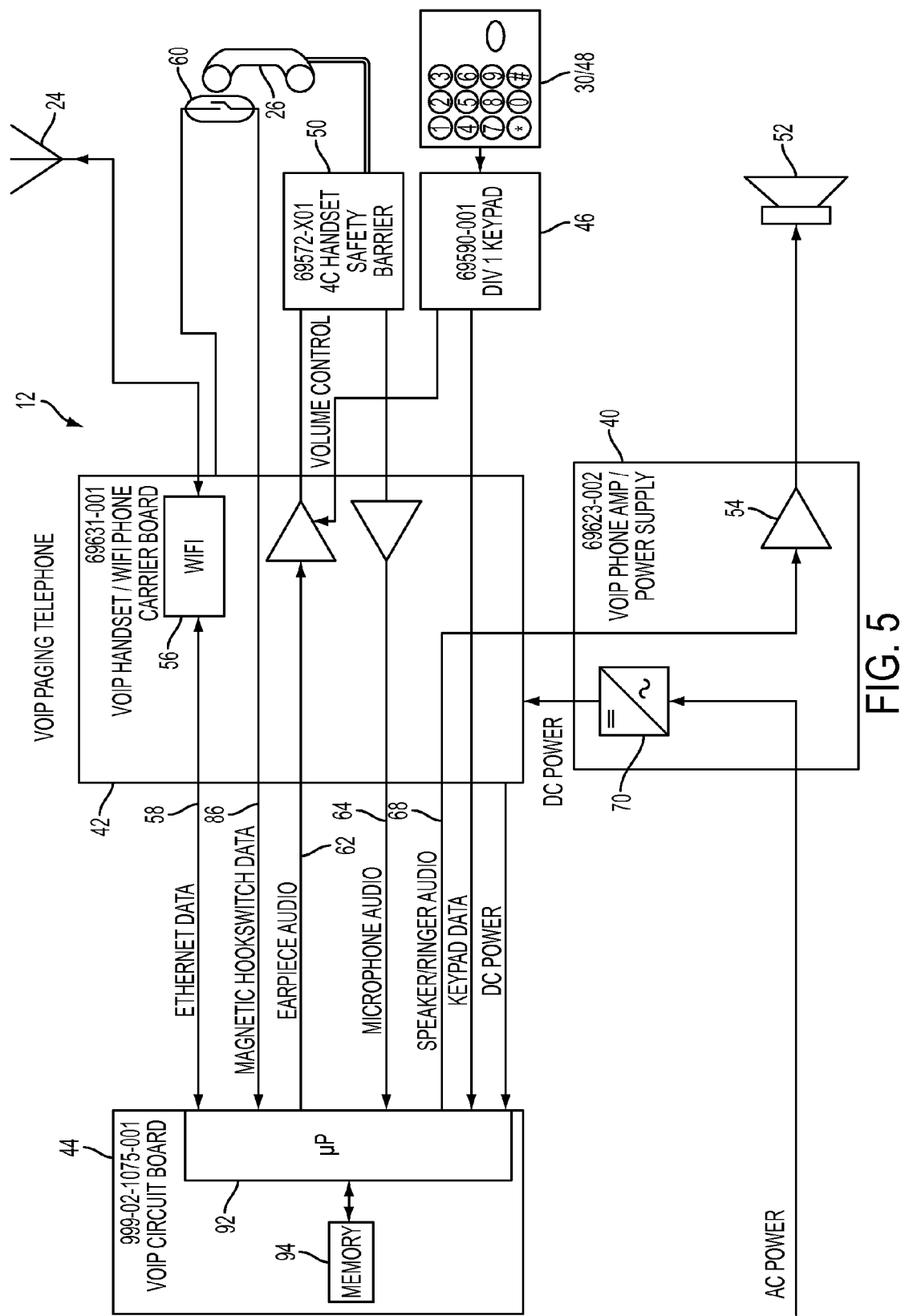
FIG. 5 is a block diagram of components of a VoIP telephone configured according to an illustrative embodiment of the present invention.
Figure 6A:
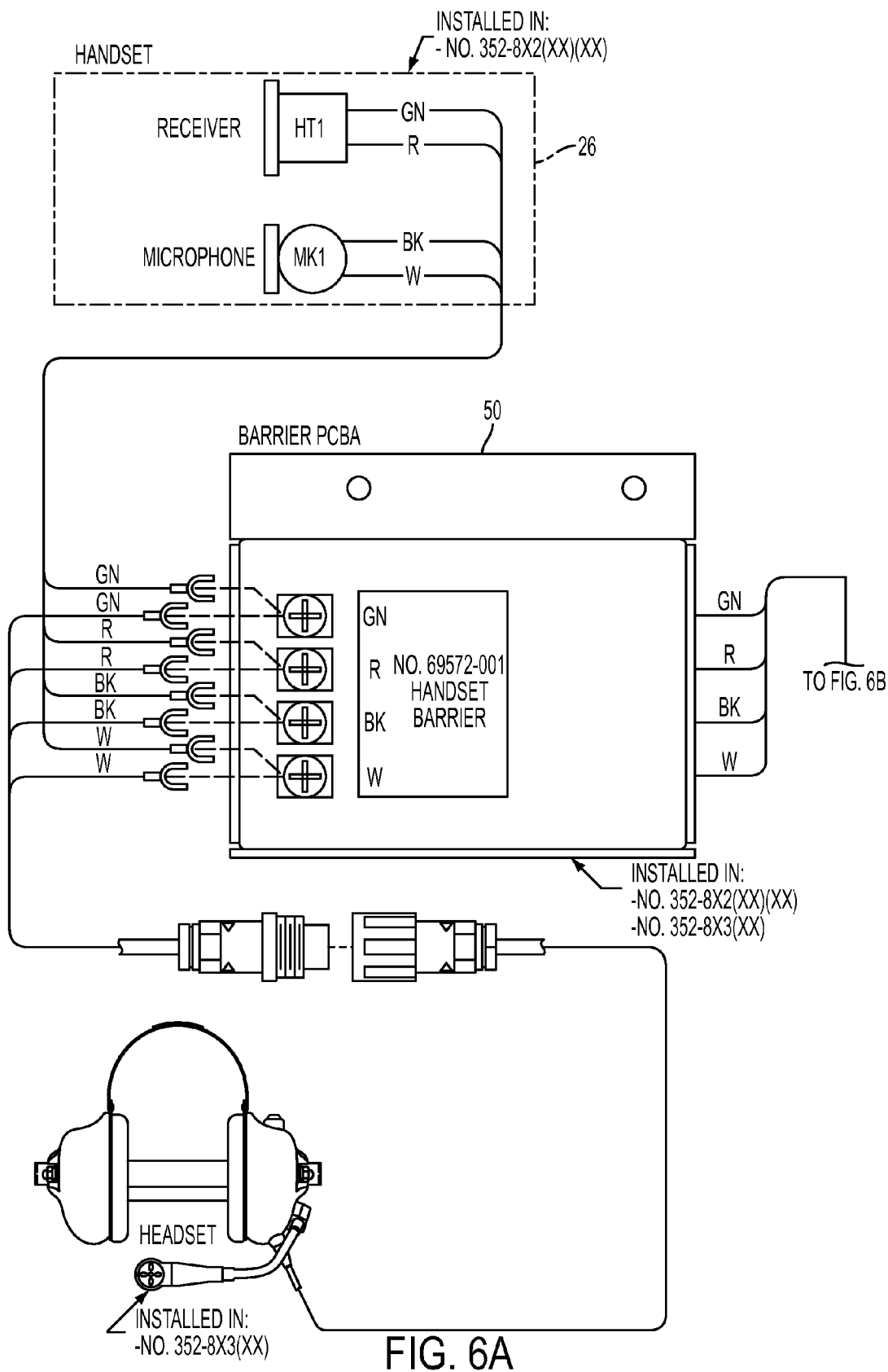
FIGS. 6A, 6B, 6C and 6D are schematic diagrams of a VoIP telephone configured according to an illustrative embodiment of the present invention.
Figure 6B:
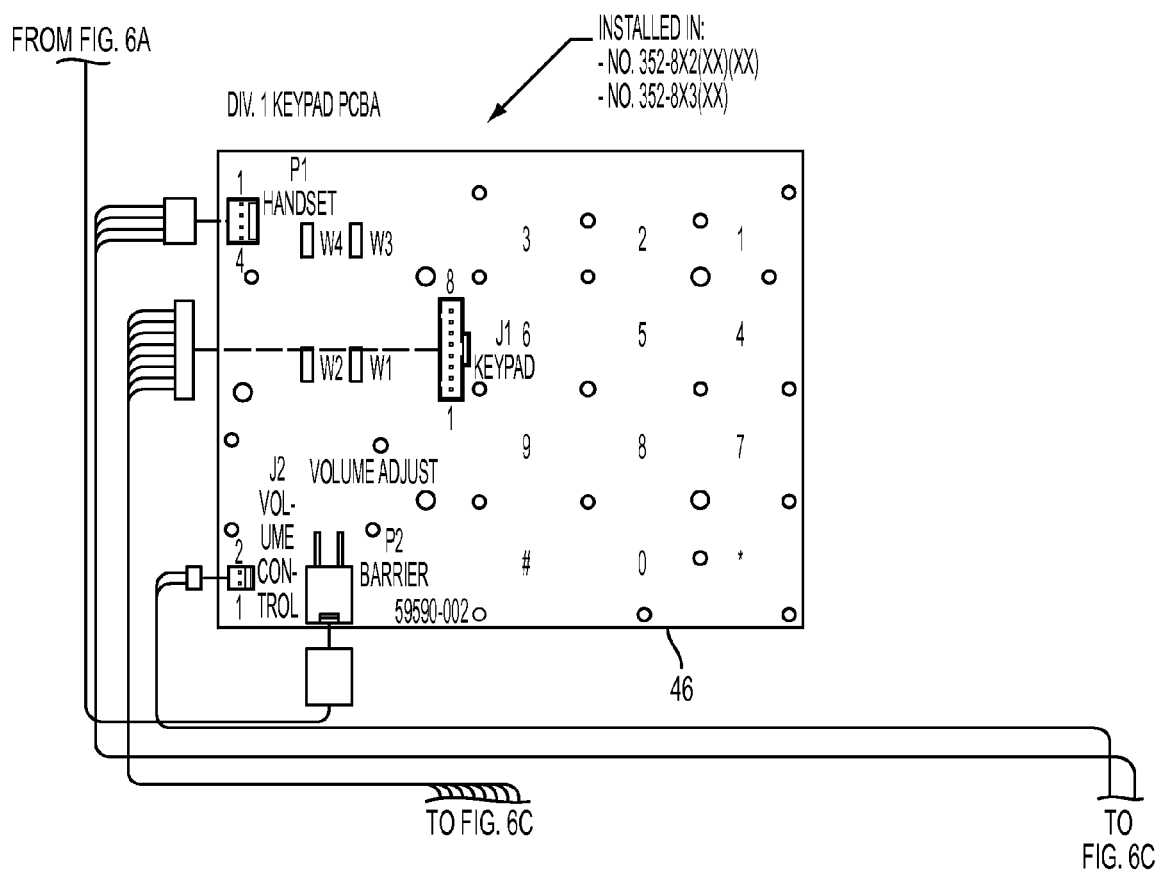
Figure 6C:
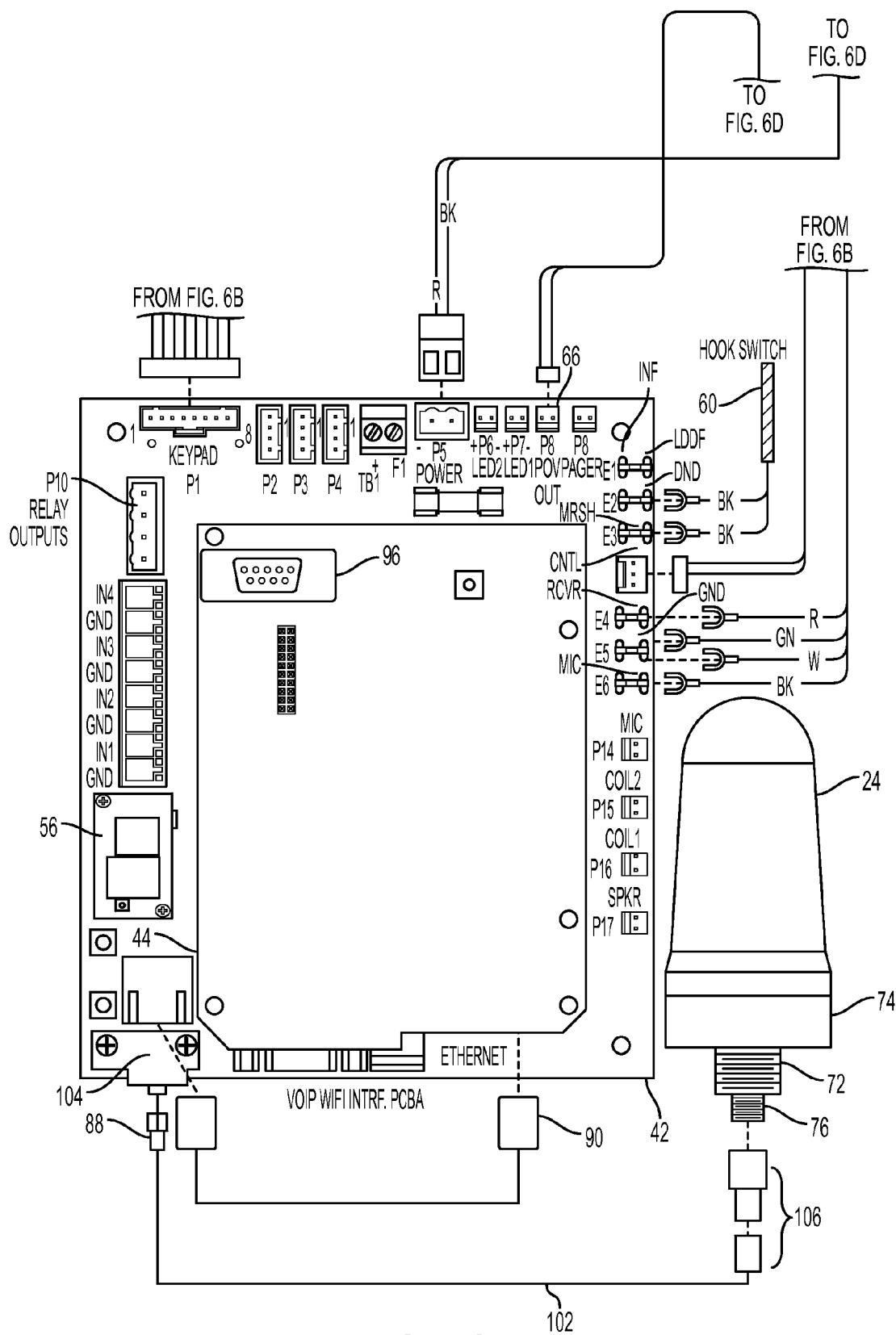

An illustrative telephone 12 will now be described with reference to FIGS. 2, 3, 4, 5 and 6. FIGS. 2, 3 and 4 are perspective views of a telephone 12 comprising, for example, a UL-compliant housing 18 for hazardous locations. As an example, the telephone 12 can comprise many of the components in a Model 352-701 VoIP Handset available from GAI-Tronics Corporation, Mohnton, Pa., which is cast aluminum, weatherproof and corrosion resistant and configured to connect to 10/100 BaseT Ethernet. The telephone 12 housing 18 comprises a faceplate 20 mounted to a circuit enclosure 22. The circuit enclosure 22 is provided with an externally mounted antenna 24 described further below. The faceplate 20 is provided with a handset 26 and cradle 28, a keypad 30 and volume adjustment control button 32. The housing 18 comprises surface/wall mount connectors 34 and a female conduit entry 36 (e.g., for building electrical power wiring). The WiFi VoIP telephone 12 can be configured to have a handset 26 and cradle 28 as illustrated in FIG. 2, or have a headset as shown in FIG. 6A, or be an amplifier-only model (i.e., with no handset or headset provided).

Figure 9:
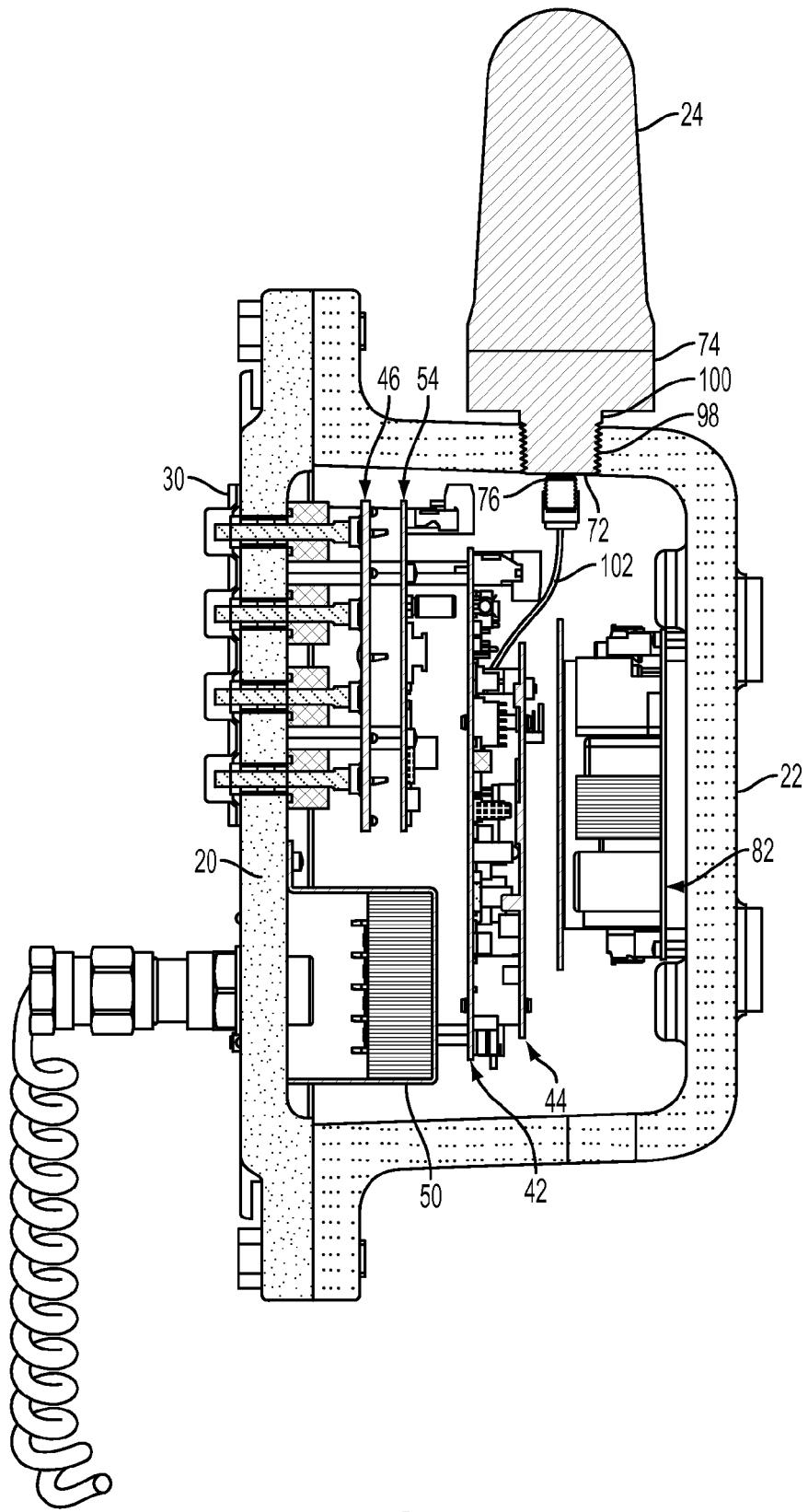
FIG. 9 is a cross-section side view of a VoIP telephone configured according to an illustrative embodiment of the present invention.
Figure 10:
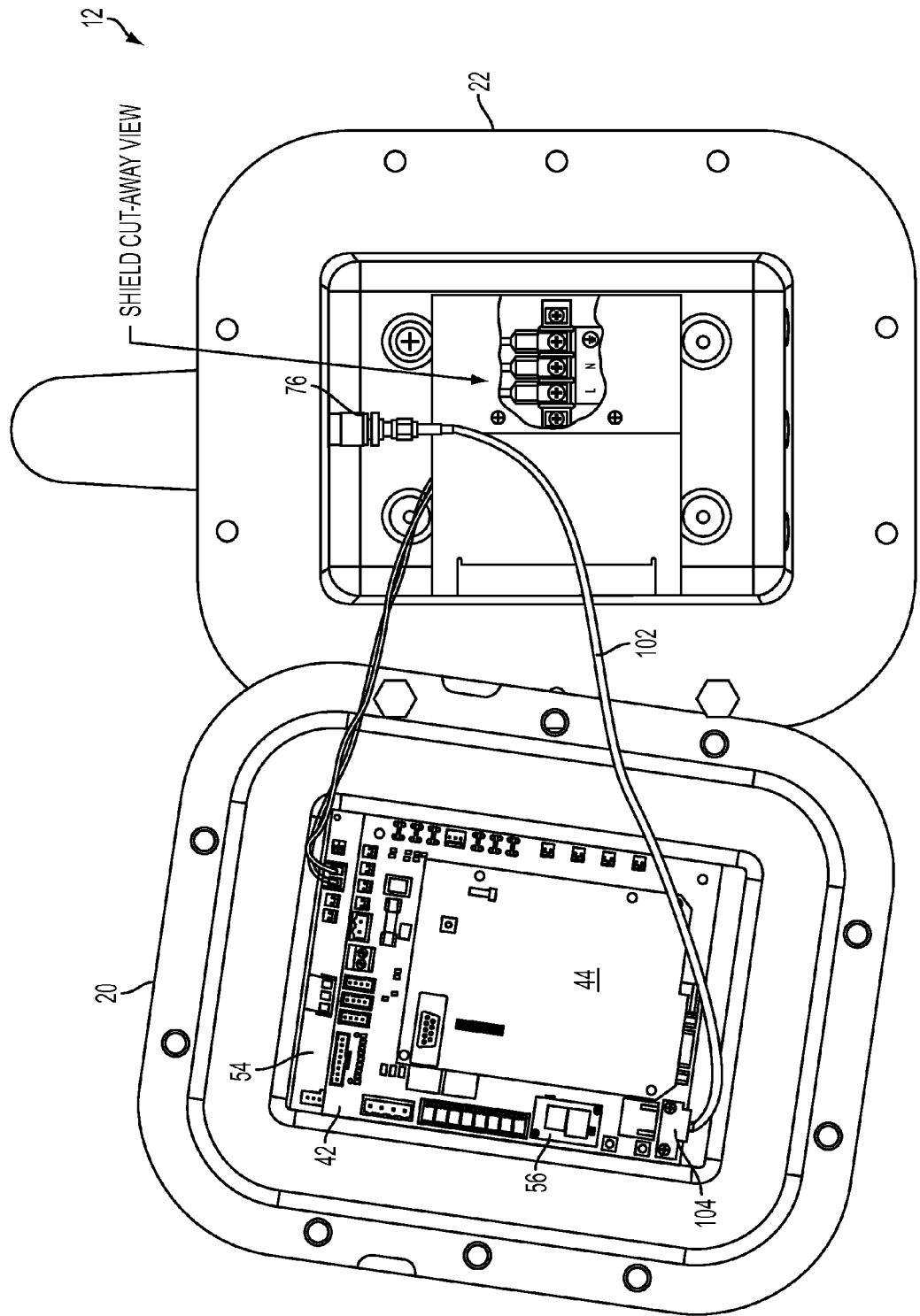
FIG. 10 depicts an interior view of the VoIP telephone of FIG. 9 showing the WiFi antenna connected to a VoIP/WiFi interface board.
Figure 11B:
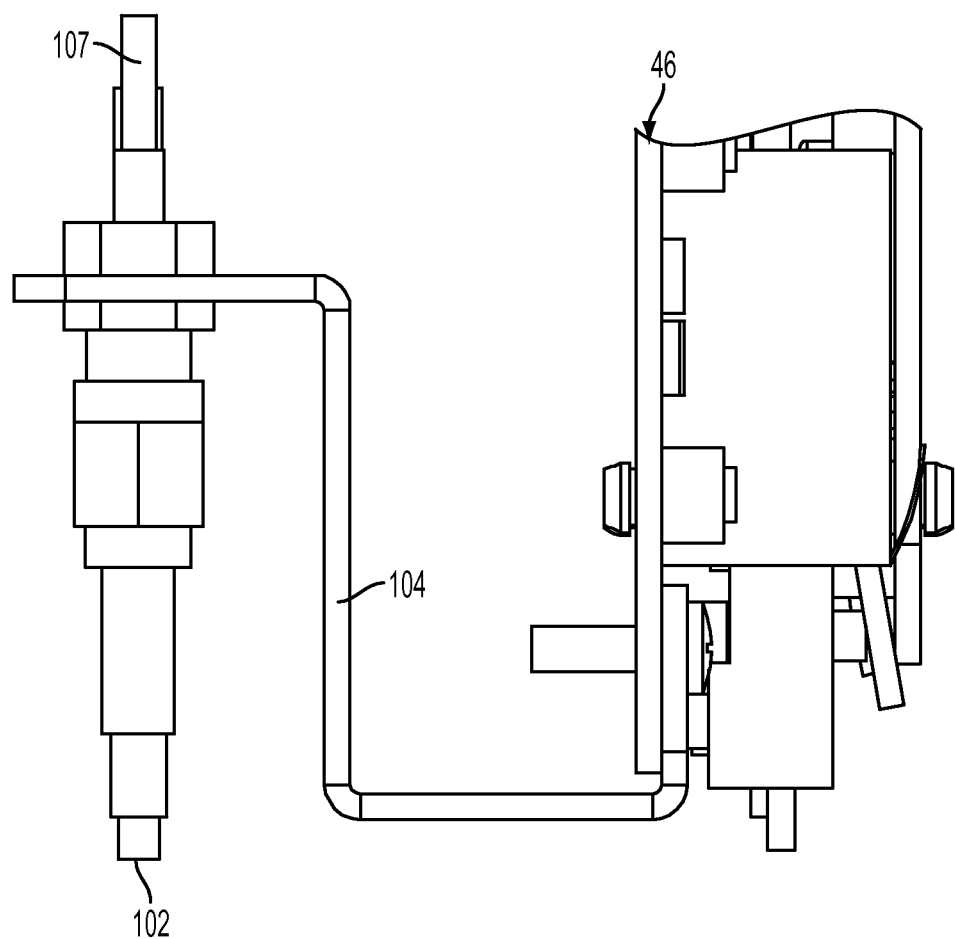
FIG. 11B is a cross-section diagram along A-A of FIG. 11A showing a mounting bracket for mounting an antenna cable to a VoIP/WiFi interface board in a VoIP telephone in accordance with an illustrative embodiment of the present invention.
Figure 11C:
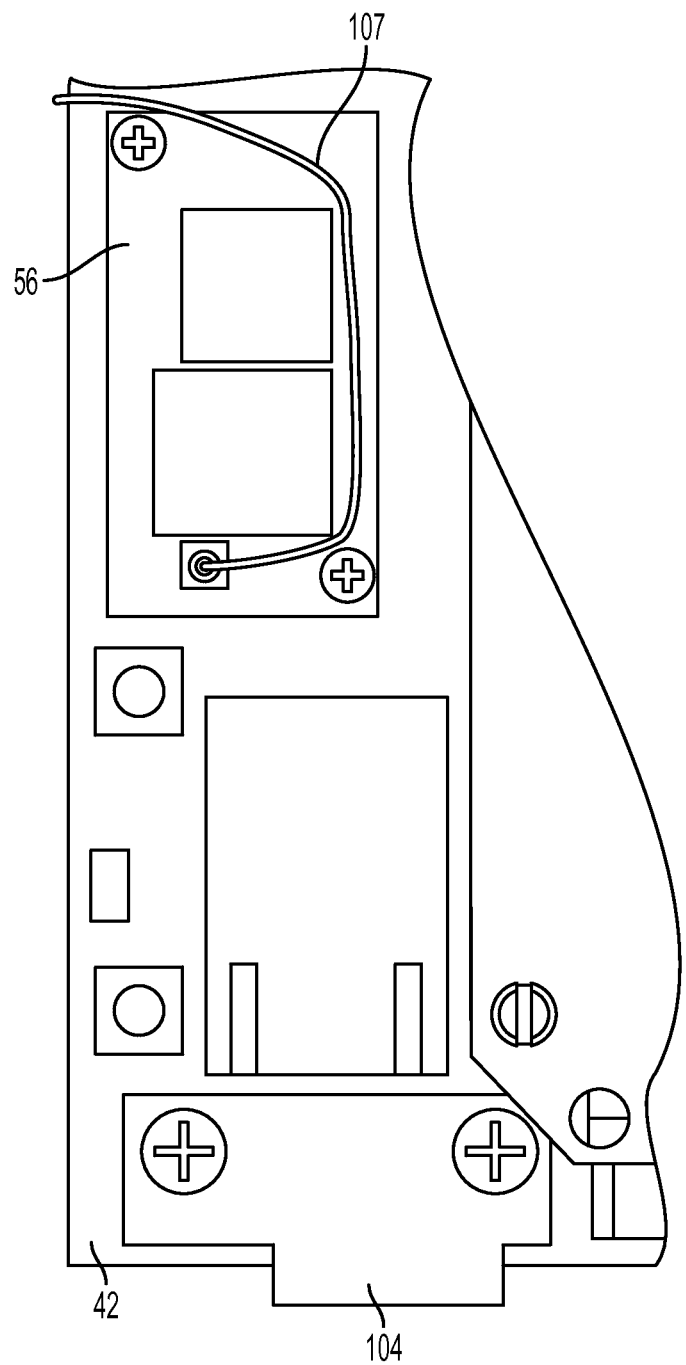
FIG. 11C is a partial view of a VoIP/WiFi interface board in a VoIP telephone in accordance with an illustrative embodiment of the present invention.

The antenna 24 is an antenna approved for use in UL Class 1 Div 1 environments and is mounted to provide at least two flame paths to achieve requisite weatherproofing and explosion-proofing or explosion containment of devices such as telephones 12 approved for use in classified hazardous locations. The top of the circuit enclosure 22 is provided with an aperture 100 (FIG. 9) through its casing (e.g., a cast aluminum or glass-enforced polyester casing) that is machined with threads 98 (FIG. 9) to receive a threaded connector 72 (FIG. 6) with corresponding threads on the end of the antenna 24. A flange 74 on the antenna 24 and this threaded connection between the threads 98 of the aperture 100 and the connector 72 provide a first flame path through which gases may escape and prevent cracking and explosion of the telephone 12. Another flame path is also achieved by the electrical connections of the antenna 24 indicated generally at 76. Both the aluminum telephone housing 18 (e.g., threads 98 in aperture 100) and the cooperating section on the exterior of the antenna 24 utilize ¾" NPT (National Pipe Tapered) threads, for example. Other types of threads can be used if specified for the application environement. For example, for WiFi VoIP telephones 12 configured to meet IEC and ATEX specifications for a classified hazardous location installation, non-tapered metric threads having a minimum 7 thread engagement can be used. Other types of threads can be employed as specified by the entity classifying the target application environment in which the VoIP telephone 12 is to be used.

Figure 6D:
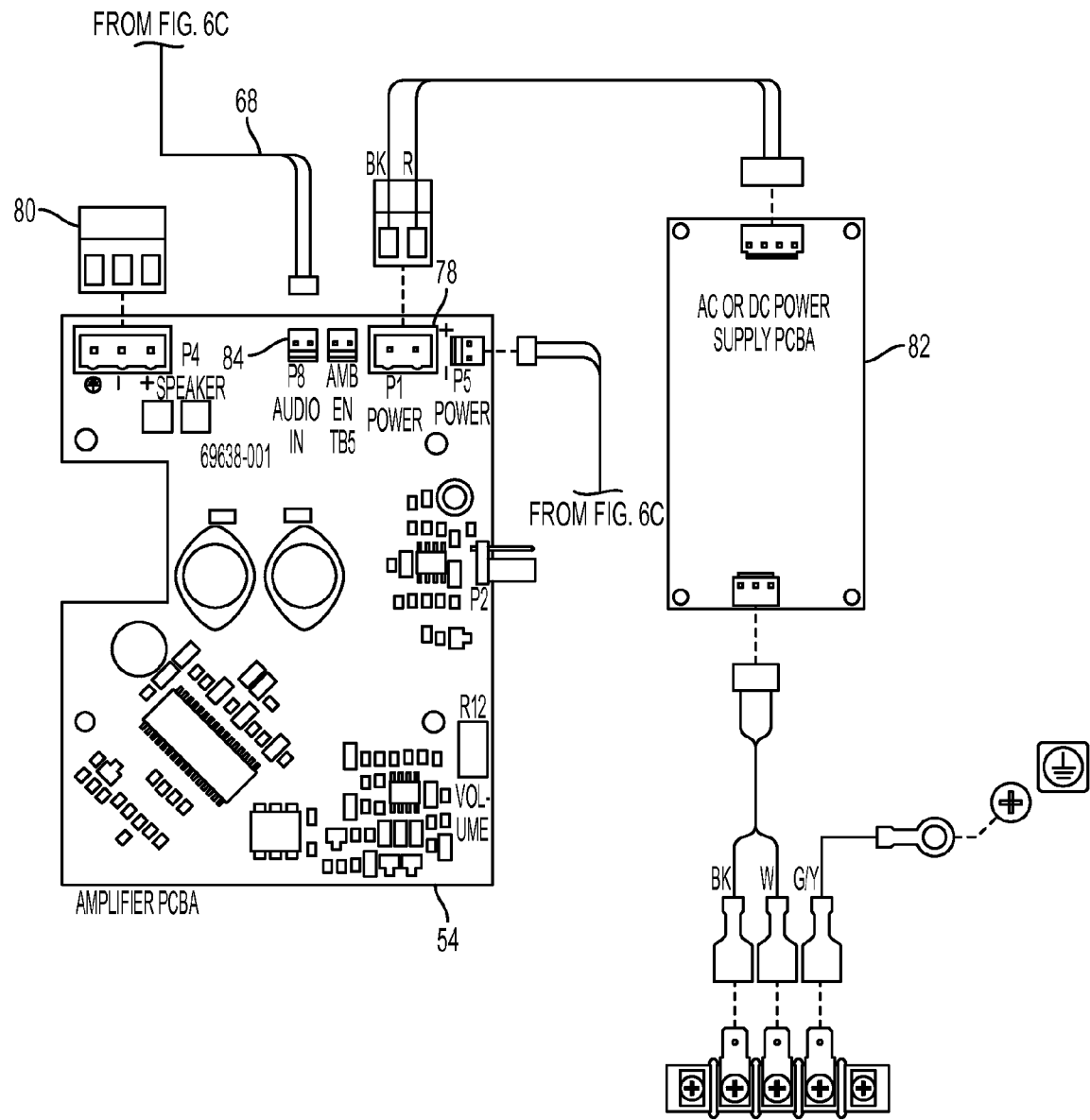

FIG. 3 is an internal view of the circuit enclosure 22 having a cavity 38 dimensioned to accommodate a number of interconnected printed circuit boards (PCBs). With reference to FIGS. 3, 4 and 5, the circuit enclosure 18 contains an amplifier/power supply board 40 (or, in an alternative illustrative implementation, separate amplifier PCB 54 and power supply PCB 82 as shown in FIG. 6D), a VoIP/WiFi interface board 42, and a VoIP control board 44. As shown in FIG. 4, which is an internal view of the faceplate 20 and the components mounted thereto, the housing 18 comprising the circuit enclosure 22 and the faceplate 20 mounted together also encloses a keypad board PCB 46, a machined keypad connector board 48 (e.g., having multiple through box operating actuators) and a handset safety barrier module 50.

The interconnectivity and operations of these boards will now be described with reference to FIGS. 5 and 6. Many of the basic components of the VoIP/WiFi interface board 42, the VoIP control board 44, the keypad board PCB 46, and the handset safety barrier module 50 for providing power, electrical interconnectivity between the telephone components, and bi-directional peer-to-peer communications via wired or wireless network are provided in, for example, the aforementioned Model 352-701 VoIP Handset. In addition, however, a number of hardware and software components are added to the telephones 12 in accordance with illustrative embodiments of the present invention to provide them with, among other things, both UL Class I Division I protection methods and improved multicast capabilities such as loudspeaker-zoned paging and hazardous area WiFi.

For example, the amplifier/power supply board 40 is provided with a Class D amplifier 54 and power supply 82 to feed a local 30 w or 8 W loudspeaker (power dependent). For example, the amplifier 54 can be a 30 watt, built-in or on-board, Class D amplifier that is selected to be efficient and provide adequate output to a loudspeaker 52 for effective operation in noisy environments. The amplifier 54 receives a speaker/ringer audio signal 68 from the VoIP control PCB 44 through the VoIP/WiFi interface board 42 via connectors 66 and 84, respectively. The amplified audio output of the amplifier 54 is provided to a speaker connector 80 electrically connected to the output of the amplifier 54. The speaker connector 80 is configured to receive or otherwise be electrically connected to a loudspeaker 52 connector or terminal or loudspeaker wires. The amplifier/power supply board 40 also comprises a power supply 82 and power connector 78 connected to building wiring received via the female conduit entry 36 of the housing 18. The power supply 82 can comprise and AC/DC converter 70, for example. Different configurations of the amplifier/power supply board 40 can be provided to accommodate different power options for the telephones 12 (e.g., AC, DC and power over Ethernet (PoE)).

With continued reference to FIGS. 5 and 6, the VoIP/WiFi interface board 42 has a WiFi module 56 coupled to the antenna 24 as indicated generally at 88 for exchanging bi-directional Ethernet data 58 with the VoIP control board 44. Local power can be provided optionally via PoE using an Ethernet cable 90. The telephone 12 is provided with a magnetic hook switch sensor 60 (e.g., coupled to the handset cradle), the output of which can be coupled to the VoIP/WiFi interface board 42 for providing on-hook/off-hook status data 86 of the handset 26 to the VoIP control board 44 (e.g., for call prioritizing). As stated above, the VoIP/WiFi interface board 42 has a connector for receiving speaker/ringer audio 64, as well as connectors (not shown) for receiving earpiece audio 62 from the VoIP control board 44 for the handset 26, and microphone audio 64 from the handset 26 for the VoIP control board 44.

There is currently no commercially-available cable assembly to connect directly from the VoIP/WiFi module 56 (e.g., a mini PCI or Peripheral Component Interconnect device that provides WiFi functionality) on the VoIP/WiFi interface board 42 to the Div. 1 Approved external antenna 24. With reference to FIGS. 6C, 10, 11A through 11C and in accordance with an illustrative embodiment of the present invention, an internal antenna bracket 104 is attached to the VoIP/WiFi interface board 42 and used to mount an approximately 3" long WiFi pigtail cable 107 that connects directly to the VoIP/WiFi module 56. The cable 107, for example, can have a mini UFL connector on one end thereof for connecting to the WiFi module 56 and an RP SMA jack on the other end thereof that is mounted to the bracket 104. The bracket, for example, can be made of bent aluminum having one section thereof with apertures that, when aligned with corresponding apertures in the board 42, receive hardware such as screws for mounting the bracket on the board 42. Another section of the bracket extends away from the card and has an aperture for securely receiving the RP SMA jack or other connector on the cable 107. A cable 102 connects the WiFi module 56 via the pigtail cable 107 to the antenna 24. For example, the cable 102 can have a RP SMA plug on one end therefore for connecting to the RP SMA jack of the pigtail cable 107 in the bracket 104. The other end of the cable can also have an SP SMA plug 108, for example. A coaxial cable assembly 106 (e.g., an adapter comprising an RP-SMA jack 110 to an RP-TNC plug 112 connection) is then used to connect the cable 102 and hence the pigtail cable to the connector 76 (e.g., an RP TNC jack) on the external antenna 24, thereby completing the signal path between the antenna 24 and the WiFi module 56 on the VoIP/WiFi interface board 42. It is to be understood that different combinations of connectors and cables can be used to connect a micro RF connector on the WiFi module 56 to the BNC or TNC connector provided on the Div. 1 Approved external antenna 24.

The VoIP control board 44 in a telephone 12 comprises a programmable processor 92 and memory 94. In accordance with illustrative aspects of the present invention, the telephones 12 are programmed (e.g., via software code provided to their respective processors 92) to establish and terminate peer-to-peer calls and prioritized multicast pages with other telephones 12 in the system 10. For example, the programmed processor 92 uses hook switch ON/OFF intelligence (e.g., data 86) for programmed overrides such as overriding a current P2P call on a telephone 12 for receiving a page. Further, the programmed processor 92 allows certain pages to be overridden by other pages, depending on the priority assigned to their respective multicast addresses via their configuration as described below using web pages. A DB-9 connector 96 is provided on the VoIP control board 44 for optional Command Line Interface (CLI) configuration.

There are three illustrative methods for configuring the VoIP telephones 12:
    Web pages
    Configuration file
    Command Line interface (CLI)

The telephones 12 are provided with an embedded web browser enabling full unit programmability for SIP and multicast paging, along with operational functionality. Web pages can be accessed over the network 14 using a browser such as Internet Explorer™ to view and change settings within a single unit 12. Alternatively, configuration files are ASCII text files containing configuration options that can be read and edited, for example, by VCONF (a dedicated software configuration tool) or similar tool, or directly by a knowledgeable user. The telephone 12 can automatically download a configuration file from the network 14, providing a controlled method of configuring multiple telephones. The telephone 12 can also be configured using a command line interface (CLI), either via the local serial port or remotely via a TELNET session over the network.

For example, configuration settings within VoIP telephones 12 can be changed by typing commands into a Command Line Interface (CLI). Generally, the CLI commands match those used in configuration files. The CLI can be accessed, for example, over a direct serial link via the integral serial port 96 or via a Telnet session over the network 14. Generally speaking, the CLI is not the preferred access method, but it may offer advantages in certain circumstances. In particular, it offers a method of accessing the telephone and discovering the IP address if it has been lost. (Password security is maintained).

Figure 7:
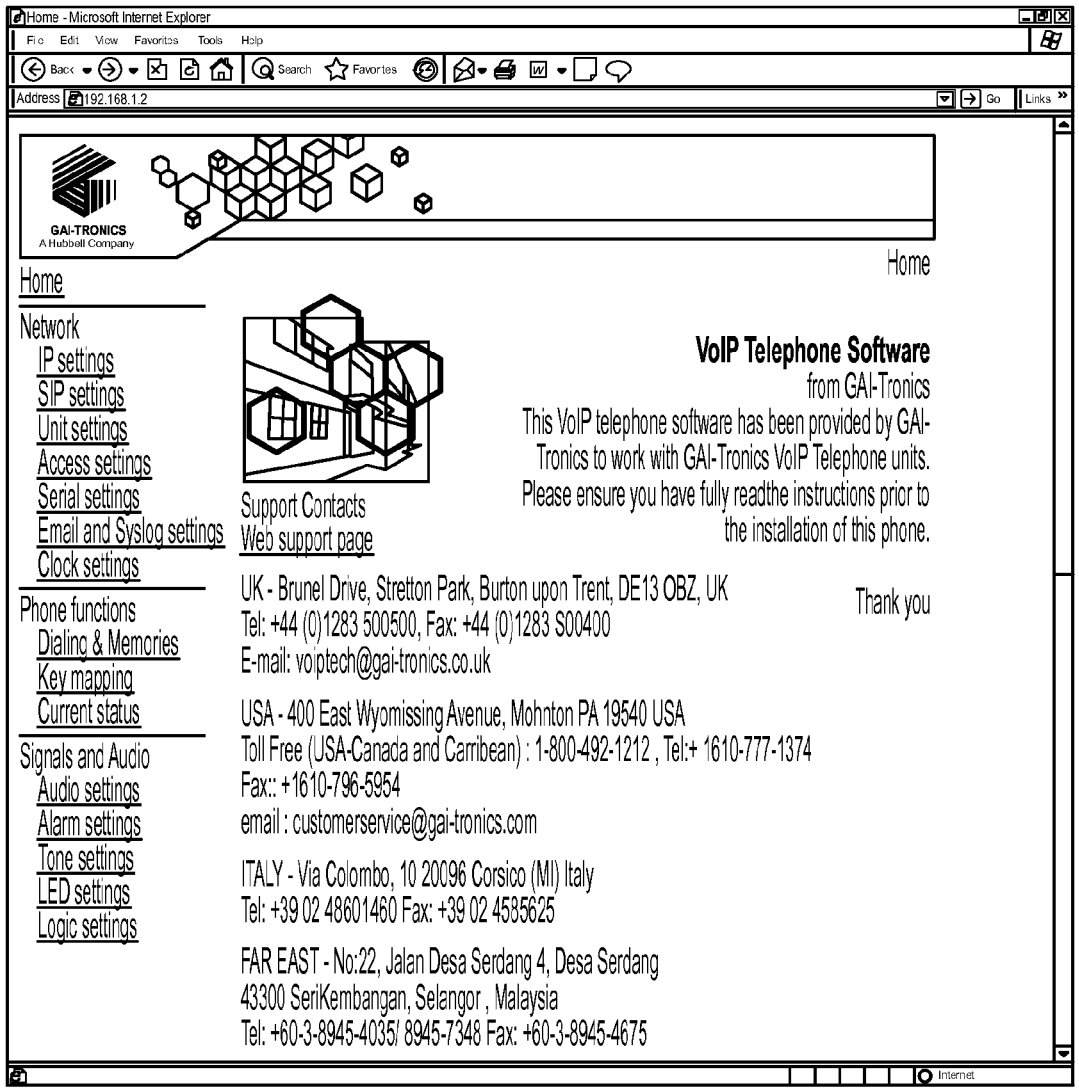
FIG. 7 is a home page among configuration web pages for a VoIP telephone according to an illustrative embodiment of the present invention.
Figure 8:
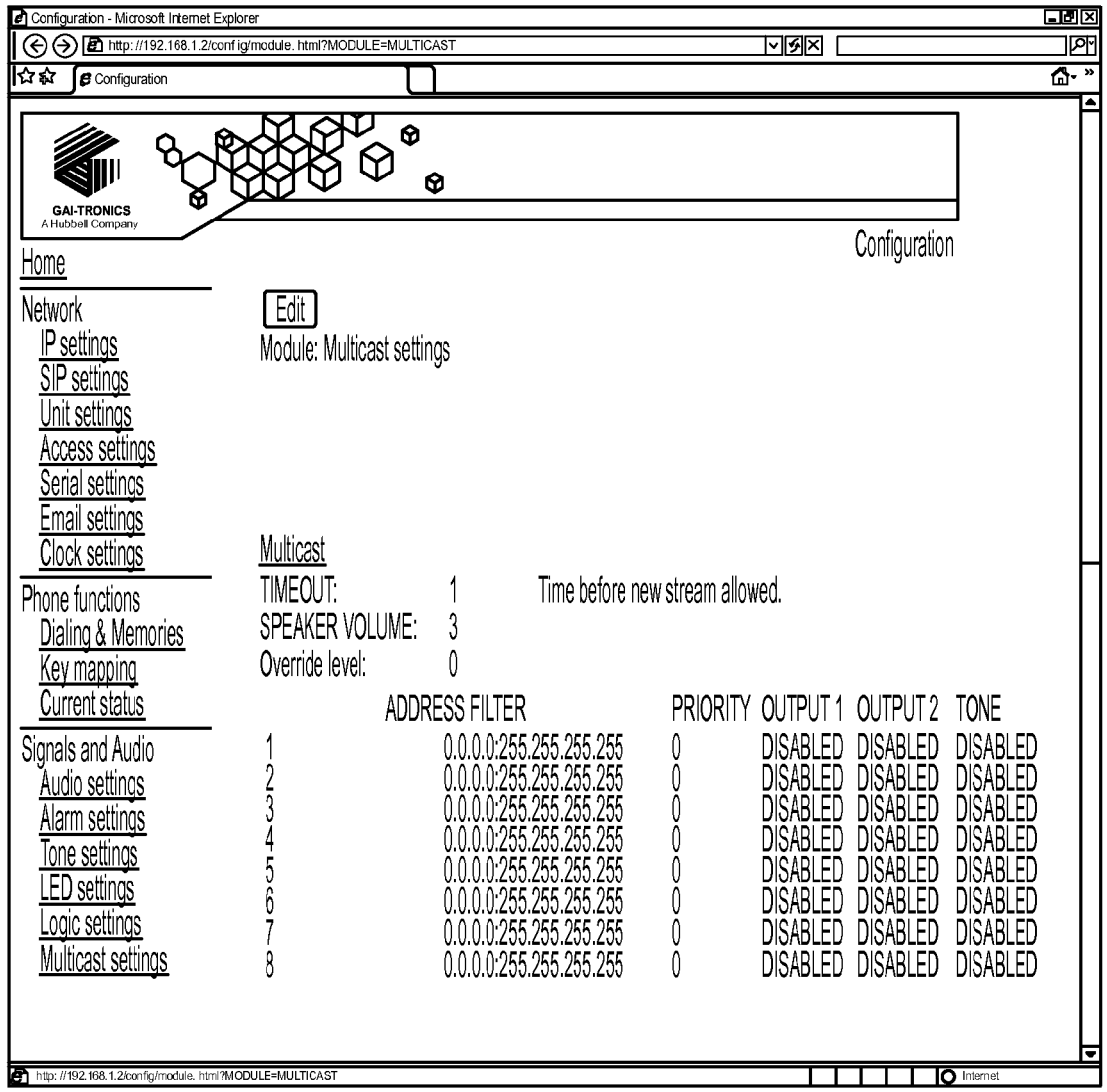
FIG. 8 is a multicast settings page among configuration web pages for a VoIP telephone according to an illustrative embodiment of the present invention.

As stated above, a user can navigate to the telephone's IP address to access its web pages for configuration using a web browser. The factory default setting is for static IP addressing, with an address of: 192.168.1.2. Note that the telephone's default subnet mask is 255.255.0.0. The telephone 12 will then request a user name and password, for example. As shown in the sample Home page in FIG. 7, a Navigation pane allows for selection of different windows or pages for configuring different settings or parameters such as IP settings, SIP settings, unit settings, and so on. One of the settings options in the Navigation pane of the Home page can be "Multicast settings" (not shown in FIG. 7). FIG. 8 depicts an illustrative web page for configuring Multicast settings.

For example, a Multicast configuration page can be provided in a telephone unit 12 wherein eight (8) (e.g., or other number) multicast IP addresses and ports are listed. The index of the IP addresses can be equivalent to the stream priority, with 1 being highest, and 8 being lowest, wherein streams with higher priorities will override those with lower priority.

These multicast IP addresses are associated with unique paging group identifiers (e.g., a selected telephone extension number). Thus, when a user dials one of the paging group identifiers on a telephone unit 12, that telephone initiates a multicast call to the VoIP server. Every telephone unit 12 configured to be part of the paging group associated with that identifier will automatically answer and output the page via its loudspeaker.

When configuring a telephone 12 for multicast operation in accordance with illustrative embodiments of the present invention, sockets (IP address and port) are defined for each paging group and prioritized as configured. For example, a typical classified hazardous location application may use paging for emergency situations and define each telephone unit 12 as an individual as well as part of one or more groups (e.g., local area, floor, whole building, plant-wide). The SIP server 16 connected by the network 14 has the identifiers (e.g., extension numbers of the units 12) used by personnel and converts them to the IP address of dialed number. For multicasts, when a telephone 12 user dials a number for a selected multicast group, the SIP server 16 has an RTP session with the initiating unit 12 and then converts to multicast by broadcasting audio to the selected multicast address. The respective telephone units 12 in the system know which Ethernet packets they are configured to receive based on multicast address in the Ethernet packets and allow audio to go to their speakers versus their earpiece outputs. For P2P calls, the SIP server controls initiation/termination of the session via RTP handshaking, or can handoff the call so the P2P units 12 communicate directly via RTP.

Below are some of the parameters configurable via the "Multicast settings" web page.

TIMEOUT: sets an enforced delay (in seconds) between one multicast session ending and another beginning. Range 1-120. Default 120

SPEAKERVOLUME: sets the speaker volume during a multicast. Volume will revert to the setting on the AUDIO page when the multicast session has ended. Range is 1 to 10, default value 3.

OVERRIDE LEVEL: sets the override level (between 0 and 8) for normal phone calls with respect to the priority level set against multicast calls defined below. 1 is highest priority, 8 is lowest. 0 means no priority and will not override any multicast. For example, if override level is set to 5, a voice call will override a multicast having a priority of 6, but not one having a priority of 4. If a voice call and a multicast have the same priority level, the multicast will take precedence. If an incoming call is made to a phone while a higher priority multicast is in progress, the caller may hear the multicast audio but a speech call will not be connected to the phone until the multicast has ended. Emergency calls started from the phone (i.e., using a button designated as an Emergency button) will typically always override any normal or multicast call, regardless of priority or override level.

The following fields can be set for the 8 individual multicast sources in accordance with an illustrative embodiment of the present invention:

ADDRESS: the phone will accept multicast calls sent to this address by the SIP server. The address can be an IP address complete with port, e.g., 242.0.1.75:5000. Reserved addresses for multicast channels are normally in the range 224.0.0.0 to 224.0.0.255.

FILTER: Sets a range of acceptable multicast source IP addresses. The phone will only accept a multicast if the source is within this IP address range, for example. The format is 2 IP addresses separated by a colon. The default is 0.0.0.0:255.255.255.255.

PRIORITY: sets a priority level for this multicast with respect to other multicasts and normal phone calls. The range is 0 to 8, with 1 being the highest priority, 8 being the lowest and 0 having no priority. If a higher priority event (multicast or phone call) occurs during an existing multicast, it will be interrupted and resume after the higher priority event has finished.

OUTPUT1: sets if OUTPUT1 is ENABLED or DISABLED during this multicast. If ENABLED, it will be in a permanently energized state, with no timing or cadence control. After the multicast has ended, it will revert to its function as defined on the LOGIC page.

OUTPUT2: sets if OUTPUT2 is ENABLED or DISABLED during this multicast. If ENABLED, it will be in a permanently energized state, with no timing or cadence control. After the multicast has ended, it will revert to its function as defined on the LOGIC page.

In addition to providing SIP operation and speaker amplifier paging, the WiFi VoIP telephones 12 constructed in accordance with embodiments of the present invention can also provide real-time alarm reporting which allowed system supervisors to monitor the telephone 12s' activities and to address caller needs or maintenance issues immediately. Real-time alarm reporting can be, for example, via email or SMTP mail message, or syslog output over TCP, or Telephone Management Application (TMA) software. Alarms can be, but are not limited to:

Handset integrity loop (if telephone 12 is configured with handset 26)
    Configuration error
    Cold reset (power cycle)
    Warm reset (internal command)
    Keypad error (e.g., stuck button)
    Key hook (off-hook status of handset provided on telephone)
    Register fail
    Audio Path test (speaker/microphone test)

Illustrative embodiments of the present invention can be implemented, at least in part, in digital electronic circuitry, analog electronic circuitry, or in computer hardware, firmware, software, or in combinations of them. The components of the telephones 12 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Illustrative embodiments of the present invention have been described with reference to a programmed physiological sensor, monitor, rules engine, server, among other components. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Also, functional programs, codes, and code segments for accomplishing the present invention can be easily construed as within the scope of the invention by programmers skilled in the art to which the present invention pertains.

Method steps, processes or operations associated with a telephone 12 can be performed by one or more programmable processors executing a computer program to perform functions of the invention by operating on input data and generating an output. Method steps can also be performed by, and an apparatus according to illustrative embodiments of the present invention, can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

While the invention herein disclosed has been described by means of specific embodiments and applications thereof, numerous modifications and variations can be made thereto by those skilled in the art without departing from the scope of the invention.

What is claimed is:

1. A voice over internet protocol (VoIP) unit comprising:
   a VoIP control module for VoIP operations among VoIP units that is configured to selectively establish peer-to-peer communication between the VoIP unit and another one of the VoIP units, and multicast paging among a plurality of the units;
   a WiFi antenna configured for operation in a hazardous area in compliance with the one or more hazardous area standards;
   a WiFi interface module connected to the VoIP control module and the WiFi antenna and configured to exchange bi-directional Ethernet data between the antenna and the VoIP control module; and
   an enclosure configured to comply with one or more hazardous area standards and enclose the VoIP control module and the WiFi interface module;
   wherein the antenna is mounted on the exterior of the enclosure through an opening therein and pressure fitted within the opening to create a flame path that retains the compliance of the enclosure with the one or more hazardous area standards when the antenna is deployed in the opening.

2. A voice over internet protocol (VoIP) unit as claimed in claim 1, wherein the antenna is pressure fitted within the exterior of the enclosure using threads along the inner circumference of the opening that cooperate with threads on the exterior section of the antenna installed within the opening.

3. A voice over internet protocol (VoIP) unit as claimed in claim 1, wherein a connector is provided on the end of the antenna and extends from the opening into the interior of the enclosure for connection to the WiFi interface module and provides a flame path that retains the compliance of the enclosure with the one or more hazardous area standards when the opening and the antenna are deployed.

4. A voice over internet protocol (VoIP) unit as claimed in claim 1, wherein the VoIP unit comprises a class D amplifier and loudspeaker connected to the amplifier to output a signal from the VoIP control module that can be detected by users above industrial ambient noise levels associated with the hazardous area in which the VoIP unit is deployed.

5. A voice over internet protocol (VoIP) unit as claimed in claim 4, wherein the amplifier is 30 W.

6. A voice over internet protocol (VoIP) unit as claimed in claim 4, wherein the loudspeaker is 8 Watts or 30 Watts.

7. A voice over internet protocol (VoIP) unit as claimed in claim 1, wherein the antenna is approved for deployment in UL Class 1, Division 1 environments.

8. A voice over internet protocol (VoIP) unit as claimed in claim 1, wherein the antenna its wired to the WiFi interface module within the enclosure using a WiFi cable connected at one end thereof to a port on the WiFi interface module and connected at the other end thereof to a first end of a coaxial cable, the coaxial cable having a second end thereof connected to the antenna.

9. A voice over internet protocol (VoIP) unit as claimed in claim 1, wherein a faceplate of the enclosure has at least one of a speaker, a handset having earpiece and microphone, and a headset.

10. A voice over internet protocol (VoIP) unit as claimed in claim 1, wherein VoIP unit is SIP-compatible.

11. A voice over internet protocol (VoIP) unit as claimed in claim 10, wherein VoIP unit is configured to employ SIP for messaging between the peer VoIP units to create, modify or terminate two-party and multicast sessions.

12. A voice over internet protocol (VoIP) unit as claimed in claim 11, wherein the VoIP unit is assigned a SIP address and a priority number within a selected range of numbers that corresponds to a respective one of a plurality of prioritized multicast addresses corresponding to respective paging groups.

13. A voice over internet protocol (VoIP) unit as claimed in claim 12, wherein the VoIP unit is configurable to initiate and receive different priorities of multicast paging via the WiFi antenna.

* * * * *